United States Patent [19]
VanBuskirk

[11] 3,992,619
[45] Nov. 16, 1976

[54] OPTICAL SCANNER

[75] Inventor: Lyman F. VanBuskirk, Ridgecrest, Calif.

[73] Assignee: The United States of America as represented by the Secretary of the Navy, Washington, D.C.

[22] Filed: June 23, 1975

[21] Appl. No.: 589,161

[52] U.S. Cl. .............................. 250/203 R; 250/234; 350/7
[51] Int. Cl.² ............................................ G01J 1/20
[58] Field of Search ............. 250/231 GY, 234, 235, 250/236, 203; 178/7.6; 350/6, 7

[56] References Cited
UNITED STATES PATENTS

| | | | |
|---|---|---|---|
| 2,972,812 | 2/1961 | Jackson | 250/203 R |
| 3,071,976 | 1/1963 | Kunz | 250/231 GY |
| 3,721,487 | 3/1973 | Pieuchard et al. | 350/7 |

*Primary Examiner*—David C. Nelms
*Attorney, Agent, or Firm*—R. S. Sciascia; Roy Miller

[57] ABSTRACT

An optical scanning system having a rotatably driven, curved reflective surface with a predetermined pattern of reflective and non-reflective portions annularly arranged near the circumference of the surface. The emission source, such as an infrared source, is focused onto an area of the surface in the ring of the portions such that when the surface is rotated the portions are rotated under the image and as each reflective portion is brought into alignment with the image, the image is reflected to a detector. The orientation of the surface is continuously monitored for correlation with each detection. The sum of the orientations at detection per rotation defines placement of the source in the field of view of the system. Appropriate computer programs may be used to increase processing speed and, thereby, increase efficiency.

7 Claims, 6 Drawing Figures

OPTICAL SCANNER

BACKGROUND OF THE INVENTION

In the field of optical search sets many systems exist employing rotating surfaces. In most the surface is planar with a patterned series of apertures therein. By rotating the disc a detector positioned behind the apertures provides outputs definitive of the placement of the source in the field of view. At least one prior system employs mirrors positioned on the inner surface of a wheel with the detector centrally located at the hub.

Disadvantages of all prior systems have been their relatively inefficient use of emission received, and thereby, their relatively limited detection capability. The present invention overcomes these disadvantages by reducing the number of optical surfaces in the path to the detector.

DESCRIPTION OF THE PREFERRED EMBODIMENT

Figure 1:
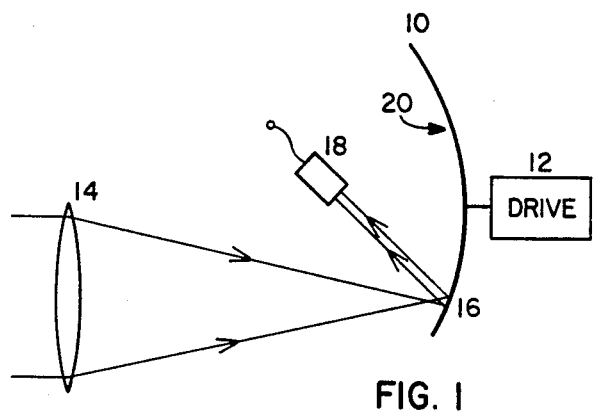
FIG. 1 is a plan view of a preferred embodiment of the present invention.
Figure 2:
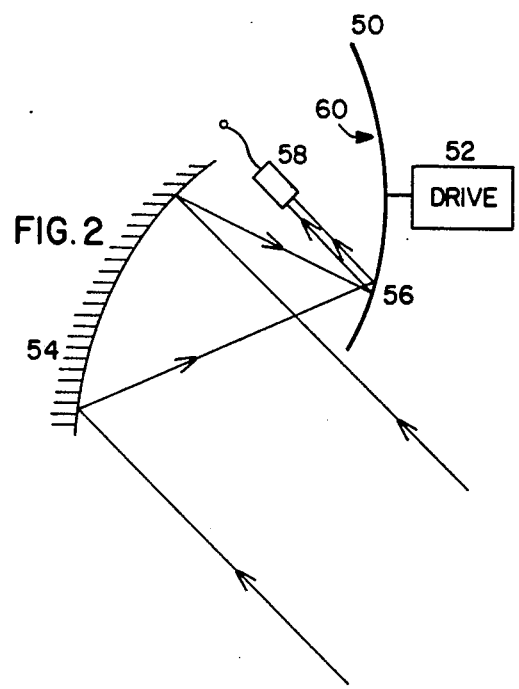
FIG. 2 is a plan view of a preferred embodiment of the present invention.

FIGS. 1 and 2 show plan views of first and second exemplary embodiments of the present invention. Both show rotatably driven curved surface 10 and 50, respectively, employed as the field lens of the optical system. That feature is common to all embodiments of the present invention and affords the advantage of greater detection efficiency by reduction in the number of optical components and their cumulative weight in materials. The present invention provides a simpler, and more importantly, more efficient use of the light emission to be detected. The elimination of each optical surface increases the amount of light available at the detector for detection.

Figure 3:
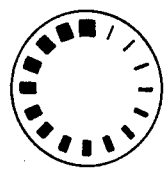
FIG. 3 is a plan view of the field lens reflective surface of the present invention with discrete pattern.
Figure 4:
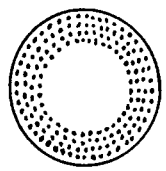
FIG. 4 is a plan view of the field lens reflective surface of the present invention with random pattern.
Figure 5:
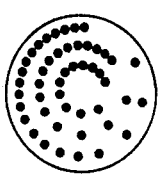
FIG. 5 is a plan view of the field lens reflective surface of the present invention to pseudo-random pattern.

FIGS. 3-5 show frontal plan views of exemplary coded patterns that may appear on the field lens, i.e., rotating discs 10 and 50. The code of reflective and non-reflective portions may be any pattern that is known by the processor and does not repeat.

The technique employed by the present invention is as follows: The pattern that appears at, say 3 O'Clock, at any moment in time identifies the orientation of the disc. Therefore, if a small window were at 3 O'Clock and the disc were rotated under the window, the pattern in the window on the occurrence of an event would identify the orientation of the disc at that event. Then, assuming the event were continuing so that numerous orientations of the disc were identified, the single small spot common to all the orientations within the window would be identified by simply stacking the disc on top of one another (assuming the disc were transparent instead of reflective). Implementation of that technique by fast electronic processing is used to identify the spot within the window or aperture, that corresponds to the position of an emission source within the field of view of the system.

The embodiment of FIG. 1 shows curved disc 10 having a coded pattern of surface 20 rotatably driven by drive 12. Light from a field of view is focused by some focusing means 14, such as a lens, onto the coded pattern of surface 20 at window 16. The coded pattern is made up of reflective and non-reflective portions, and that segment of the field of view falling on a reflective portion of the pattern within window 16 is reflected to detector 18. If window 16 includes an image of a source of emission that is present within the field of view of the system it will be detected numerous times per rotation of the disc, and a disc orientation will be identified for each detection.

The embodiment of FIG. 2 shows a second arrangement for converging emission occuring within the field of view onto the detector. In this embodiment, fixed, curved reflective surface 54 is employed as the focusing means for converging emission with the field of view onto surface 60 at aperture 56. Many other embodiments wherein the field of view including any emission source present therein is focused as an image onto a coded surface having a predetermined pattern of reflective and non-reflective portions, and wherein the rotating disc acts as a field lens to collimate the image reflected thereby to the detector, may be implemented, and all such embodiments are considered to be implementations of the present invention.

The present invention operates as follows: fixed detector 18(58) is placed in the reflective path of window 16(56), and curved disc 10(50) having a coded pattern of surface 20(60) is rotatably driven by drive 12(52) to pass the coded pattern through window 15(56). Any emission source within the field of view of the system is imaged on surface 20(60) at window 16(56) by focusing means 14(54). The orientation of the disc is monitored and its position at the moment detector 18(58) senses an image reflected by surface 20(60) in window 16(56), as shown by FIG. 6, is recorded.

Figure 6:
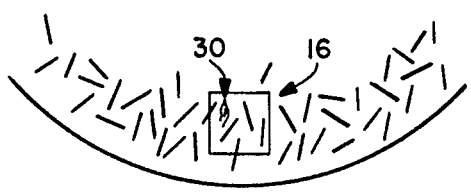
FIG. 6 is a descriptive illustration showing the aperture on the pattern portion of the surface with the source of interest appearing therein, wherein a fourth exemplary pattern is shown.

In FIG. 6, the emission source is shown as image 30 in window 16 and its position within the window is definitive of its position within the field of view of the system. Therefore, measuring the image's position within the window, measures the position of the source within the field-of-view of the system. It is suggested that the data generated by the system be processed by fast Fourier of fast Hadamard techniques for efficiency.

Other techniques may be substituted for those discussed and applied to the information generated, and they might be superior to those mentioned depending on the intended application. In a very crude form, and for a non-moving target, processing could be done manually. The operator could record the pattern present in window 16 and manually correlate the patterns to determine the reflective spot common to all. That spot would then identify the position of the source within the field of view.

For optimal operation it is recommended that all reflector optics as well as large area detectors be used.

To those skilled in the art it will be obvious upon a study of this disclosure that the present invention permits a variety of modifications and hence can be given embodiments other than those particularly illustrated and described herein, without departing from the essential features of the invention and within the scope of the claims annexed hereto.

What is claimed is:

1. An optical scanner for measuring the placement of an emission source in the field of view of the scanner, comprising:
   a rotatable structure having a curved surface with a predetermined pattern of reflective and non-reflective portions near the perimeter of said surface;
   means for rotating said structure;
   means for focusing an image of said source on an area of said surface occupied by said portions; and
   means for detecting the image reflected by said reflective portions;
   wherein the rotational orientation of the surface is identified for each detection such that the sum of all said identified orientations measures the placement of said source within said field of view.

2. The scanner of claim 1 wherein said rotatable structure is concave to said field of view and said detecting means is centrally located within the curvature of said structure.

3. The scanner of claim 2 wherein said predetermined pattern is a discrete pattern of portions.

4. The scanner of claim 2 wherein said predetermined pattern is a random pattern of portions.

5. The scanner of claim 2 wherein said focusing means is a lens.

6. The scanner of claim 2 wherein said focusing means is a reflective member.

7. The scanner of claim 2 wherein said rotating means is a drive including means for continuously sensing its rotational position.

* * * * *